(12) United States Patent
Mamoudis et al.

(10) Patent No.: US 7,999,818 B2
(45) Date of Patent: Aug. 16, 2011

(54) HANDS-FREE, USER-FORMATTED INSTRUCTION DISPLAY SYSTEM

(76) Inventors: John T. Mamoudis, Virginia Beach, VA (US); Lisa K. Lucas, Chesapeake, VA (US); James S. Lucas, II, Chesapeake, VA (US)

( * ) Notice: Subject to any disclaimer, the term of this patent is extended or adjusted under 35 U.S.C. 154(b) by 971 days.

(21) Appl. No.: 11/899,681

(22) Filed: Sep. 7, 2007

(65) Prior Publication Data
US 2009/0066708 A1   Mar. 12, 2009

(51) Int. Cl.
*G09G 5/39* (2006.01)
*G09G 5/08* (2006.01)
*G06F 3/033* (2006.01)

(52) U.S. Cl. ......................................... 345/531; 345/158
(58) Field of Classification Search ........................ None
See application file for complete search history.

(56) References Cited

U.S. PATENT DOCUMENTS

| | | | |
|---|---|---|---|
| 5,844,824 A * | 12/1998 | Newman et al. | 345/156 |
| 5,928,227 A * | 7/1999 | Howard et al. | 606/40 |
| 6,422,941 B1 * | 7/2002 | Thorner et al. | 463/30 |
| 6,467,097 B1 | 10/2002 | Kutner | |
| 6,532,482 B1 * | 3/2003 | Toyosato | 708/131 |
| 6,558,325 B1 | 5/2003 | Pang et al. | |
| 7,299,034 B2 * | 11/2007 | Kates | 455/415 |
| 2002/0072815 A1 * | 6/2002 | McDonough et al. | 700/92 |
| 2002/0155925 A1 * | 10/2002 | Smith | 482/4 |
| 2004/0006266 A1 | 1/2004 | Ustuner et al. | |
| 2005/0049502 A1 | 3/2005 | Schoisswoh | |
| 2007/0210983 A1 * | 9/2007 | Dove et al. | 345/2.1 |

OTHER PUBLICATIONS

PCT International Search Report, PCT Article 18 and Rules 43 and 44, 3 pages total, date of the actual completion of the International Search Jan. 10, 2008, date of mailing of the International Search Report Jan. 25, 2008.

* cited by examiner

*Primary Examiner* — Kee M Tung
*Assistant Examiner* — Jacinta M Crawford
(74) *Attorney, Agent, or Firm* — Wooten & Shaddock, PLC

(57) ABSTRACT

An instruction display system includes memory for storing instruction information in a format specified by the user, a display, and a hands-free user-controlled processor. Hands-free user inputs define selected portions of the stored instruction information that are to be displayed. The memory, display and processor are coupled to the user by a mounting assembly that allows the user to readily view the display for a particular activity.

17 Claims, 3 Drawing Sheets

US 7,999,818 B2

HANDS-FREE, USER-FORMATTED INSTRUCTION DISPLAY SYSTEM

FIELD OF THE INVENTION

The invention relates generally to instructional systems, and more particularly to an instruction display system that displays user-formatted instruction data that is selected by a user in a hands-free fashion.

BACKGROUND OF THE INVENTION

Typically, no two people perform the same activity in the same way. That is, while each person may want the same end result for an activity, their methods for achieving the end result will vary due to differences in physical abilities and/or mental abilities. For example, one chef might only need a list of ingredients to prepare a particular meal while another chef might need the ingredients lists, the order of preparation, time for mixing/cooking, etc. in order to prepare the same meal. Another example of this situation is golf. No two golfers are built the same way so no two golfers will have the same golf swing. Accordingly, teaching golf professionals will generally tailor their instruction for a particular individual. For the golfer to truly benefit from such specialized golf instruction, the golfer must practice what he was taught on his own. However, without the teaching professional at the golfer's side, it can be very difficult to remember all of the instruction tips one receives during a golf lesson.

In addition to the fact that different people apply different methods to achieve the same end result, many activities (e.g., jobs, hobbies, sports, etc.) require the use of one's hands in the activity. This can make it difficult for one to consult notes about how the activity should be performed. Once again, consider the case of a golfer whose hand placement and movement are critical to the end result. That is, it would not be desirable or practical for a golfer to consult hand-held notes about his specialized golf instruction while he was trying to practice.

SUMMARY OF THE INVENTION

Accordingly, it is an object of the present invention to provide a system that allows a user to format an instruction set related to an activity and then display the instruction set in a hands-free fashion.

Another object of the present invention is to provide a hands-free instruction display system that one can readily use while performing an activity that requires the use of one's hands.

Other objects and advantages of the present invention will become more obvious hereinafter in the specification and drawings.

In accordance with the present invention, an instruction display system includes memory adapted to be accessible by a user for storing instruction information in a format specified by the user. A display is provided to display selected portions of the stored instruction information. A hands-free user-controlled processor, coupled to the memory and display, receives user inputs in a hands-free fashion. The user inputs define the selected portions of the stored instruction information that is to be displayed. Mounting means attach to the user for the purpose of coupling the memory, display and processor to the user.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
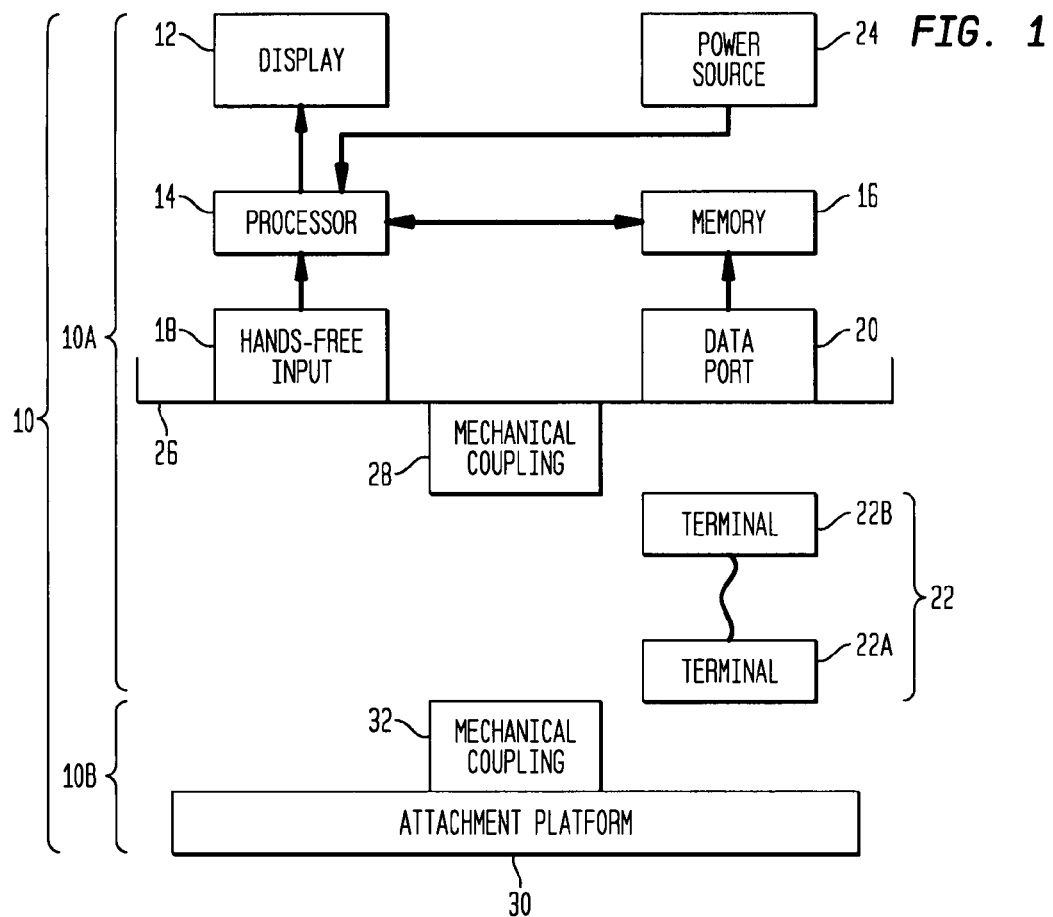
FIG. 1 is a functional block diagram of a hands-free, user-formatted instruction display system in accordance with an embodiment of the present invention.

Referring now to the drawings and more particularly to FIG. 1, a hands-free user-formatted-instruction display system in accordance with an embodiment of the present invention is shown and is referenced generally by numeral 10. System 10 can be used to display instructions, tips, lessons, reminders, etc. (hereinafter referred to as "instructions"), related to a particular activity where the instructions have been written or formatted by a particular individual in a way that is most beneficial for that individual. Accordingly, system 10 can be used by individuals for a variety of activities (e.g., jobs, sports, hobbies, etc.). In particular, system 10 is designed to allow the individual to select the various instructions for display in a hands-free fashion. Accordingly, system 10 can be used in a variety of activities that require the individual to use his hands when performing the activity (e.g., carpenter, chef, golfer, seamstress, etc.). However, by way of an illustrative example, the present invention will be explained in terms of its use by a golfer.

System 10 has two main parts 10A and 10B. Briefly, electronic elements 10A facilitate the instruction formatting and display functions, and attachment elements 10B position/hold electronic elements 10A in place on a user. In the illustrated embodiment electronic elements 10A include a display 12, a processor 14, memory 16, a hands-free input device 18, a data port 20, and a detachable data transfer cable 22. Typically, electronic elements 10A will also include a power source 24, a platform 26 that supports the various electronic elements 10A, and a mechanical coupling 28. Attachment elements 10B include an attachment platform 30 and a mechanical coupling 32 as will be explained further below.

Display 12 is any conventional display device capable of reproducing text, graphic and/or video instructions that have been formatted by the user of system 10. For the illustrated example where system 10 will be used by a golfer, display 12 can be a liquid crystal display (LCD) as these displays are easily viewed in bright light conditions. However, it is to be understood that other display devices could be used without departing from the scope of the present invention.

Processor 14 is any conventional chip processor capable of handling the various data processing tasks of system 10 (e.g., data transfer from memory 16 to display 12 as requested by input device 18, power monitoring and distribution, attribute settings of display 12, etc.). Such processors are well understood in the art.

Memory 16 is any conventional read/write memory that can be separate from processor 14 or incorporated therewith without departing from the scope of the present invention. In the illustrated embodiment, memory 16 is a permanent part of electronic elements 10A. Memory 16 receives/stores the various instructions that have been written/formatted by a user in a way that is most helpful to that user. For the golfer example, the user could write/format specially-tailored instructions received from the golfer's professional coach. The instructions could be related to driving the ball, hitting long/short irons, sand shots, putting, gauging distance, etc. Further, the instructions would be formatted in a way that the user can readily recall what he had been taught for his particular game. In this way, the user can essentially re-visit his specially-designed instructions on-demand as will be explained in greater detail below.

To load data into memory 16, data transfer cable 22 couples a conventional computer (e.g., laptop, desktop, hand-held, etc.) to memory 16 via data part 20. More specifically, data transfer cable 22 has (i) a first terminal 22A designed to connect to the conventional computer (not shown), and (ii) a second terminal 22B designed to connect to data part 20. Terminals 22A and 22B could be the same or different depending on hardware requirements. Examples of terminals 22A and 22B include, but are not limited to, serial data transfer terminals such as the ubiquitous USB terminal, an LED transmitter for cooperation with an LED receiver, and an RS-232 terminal just to name a few.

Figure 2:
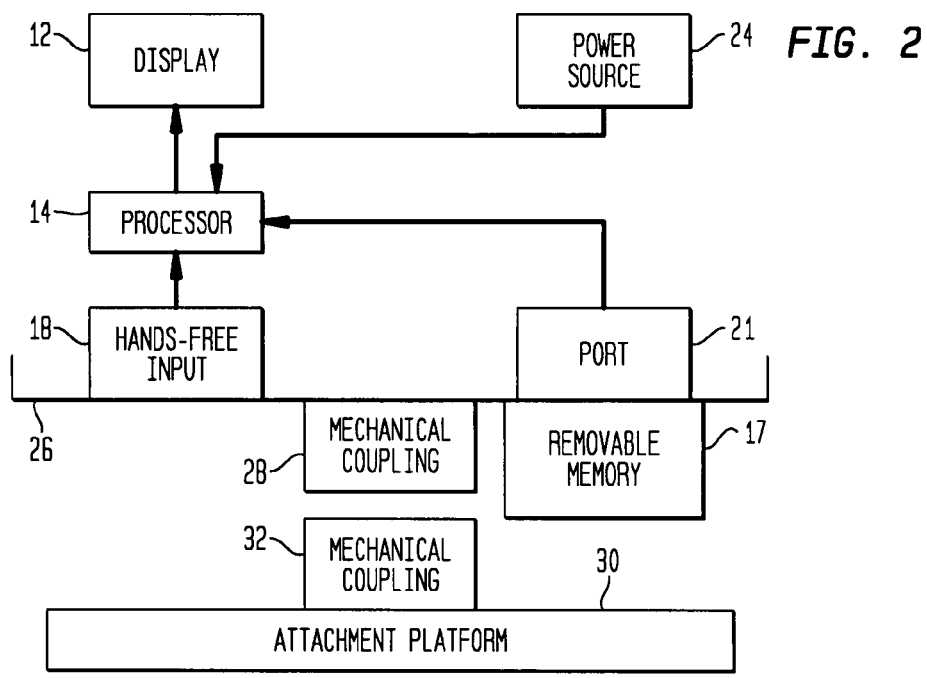
FIG. 2 is a functional block diagram of a hands-free, user-formatted-instruction display system in accordance with another embodiment of the present invention.
Figure 3:
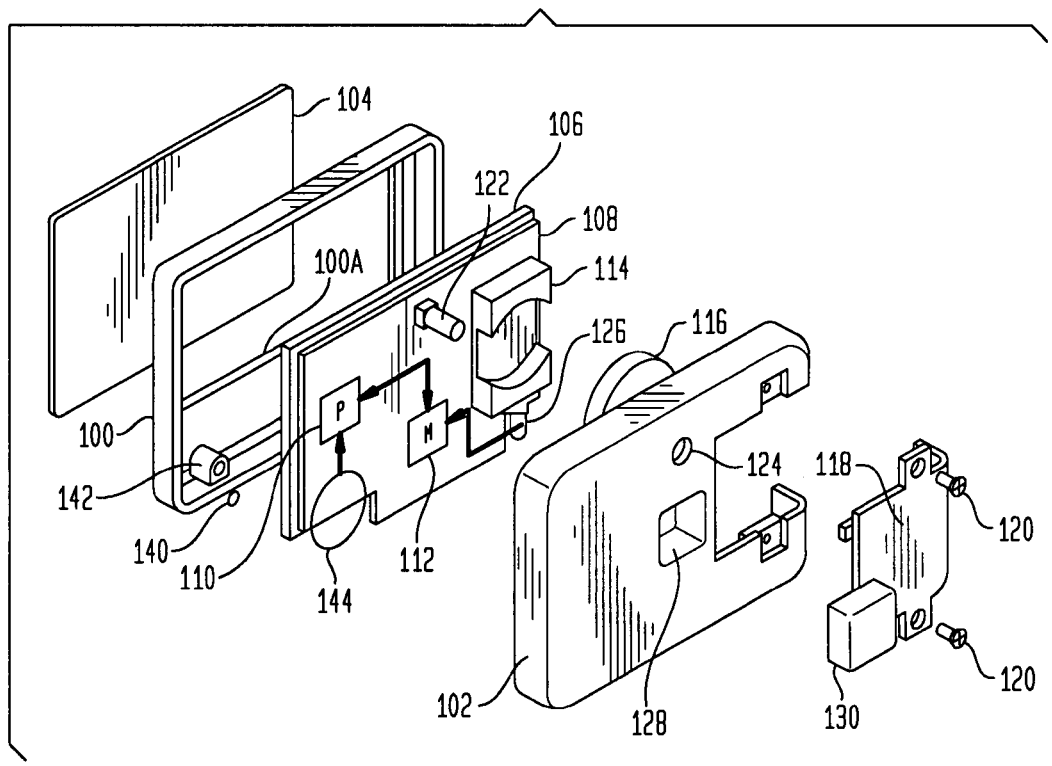
FIG. 3 is an exploded view of the electronic elements packaged in accordance with an embodiment of the present invention.

The present invention is not limited to use of the combination of onboard memory 16, data port 20, and data transfer cable 22. For example, as illustrated in FIG. 2, memory in the present invention can be provided by a removable memory 17 (e.g., a memory "stick" as they are known). Removable memory 17 can be plugged into a conventional computer (not shown) so that a user can download his user-formatted instructions thereto. Removable memory 17 would then be removed from the computer and plugged into a port 21 (e.g., a USB port) for access by a processor 14.

Power for the above-described elements can be supplied by an onboard power source 24 such as removable and/or rechargeable batteries. Power source 24 could also include solar-powered cells for primary power, back-up power, or recharging power. Power source 24 could be directly connected to any element requiring power, or could just supply power to processor 14 (as shown) with processor 14 then making power available to other elements.

Hands-free input device 18 is any device that can provide input signals to processor 14 in order to initiate the transfer of user-formatted instructions to display 12. For example, hands-free input device 18 could be a simple switch that causes processor 14 to sequentially step or scroll through the instructions stored in memory 16 each time input device 18 is actuated. Accordingly, input device 18 could be a simple digital switch having a hands-free actuation feature. With each hands-free actuation, a pulse is generated. The generated pulse is used by processor 14 to cause the next instruction in memory 16 to be displayed on display 12. An example of input device 18 will be described later below.

Referring next to attachment elements 10B, attachment platform 30 is attached to a user to provide a mounting platform for electronic elements 10A. That is, attachment platform 30 is attached to a user such that mechanical couplings 28 and 32 can cooperate with one another to ultimately attach electronic components 10A to the user. In general, attachment platform 30 can be realized by a clip, belt, strap, etc., attachable to some part of a user or the user's clothing. For the illustrated example of a user that is a golfer, it is preferred that attachment platform 30 be attachable to the user's foot (i.e., on or over the user's golf shoe) so that display 12 is readily viewable by the user as the user addresses a golf ball prior to striking same.

Referring now simultaneously to FIGS. 3, 4, 5A and 5B, a specific embodiment of the present invention will be explained. A housing for the various electronic elements is defined by a top half 100 and a bottom half 102 that can be snapped, glued, welded, etc., together to from the support and protection for the electronics. A protective lens (e.g., non-glare material) 104 is provided to fit within an opening 100A formed in top half 100. An LCD screen 106 is coupled to a printed circuit board (PCB) 108 on which electronic components are mounted. Briefly, PCB 108 has a processor ("P") 110 and memory ("M") 112 mounted therein. A battery housing 114 is also provided on PCB 108 to support a battery 116 where power is supplied as needed in ways well known in the art. Battery 116 can be replaced via an access door 118 attachable to bottom half 102 using, for example, screws 120. A power switch 122 is also provided on PCB 108. Switch 122 will be accessible through bottom half 102 via a hole 124 formed therethrough. A data port 126 is provided to allow a data transfer cable (not shown) to be coupled to memory 112. A receptacle 128 is formed in bottom half 102 and a magnet 130 is provided to fit and be retained within receptacle 128.

In this illustrated embodiment, the hands-free input function is provided by the combination of (i) a ball bearing 140 loosely fitted in a sleeve 142 (e.g., formed in top half 100), and (ii) a piezoelectric element 144 supported by PCB 108. Briefly, actuation occurs when housing 100/102 is moved such that ball bearing 140 and sleeve 142 experience relative movement therebetween such that ball bearing impacts piezoelectric element 144. This impact causes element 144 to generate a digital pulse that is passed to processor 110. Upon receipt of such a pulse, processor 110 retrieves the next instruction from memory 112 and provides same to LCD screen 106. The required relative movement between ball bearing 140 and sleeve 142 will be explained further below.

Figure 5A:
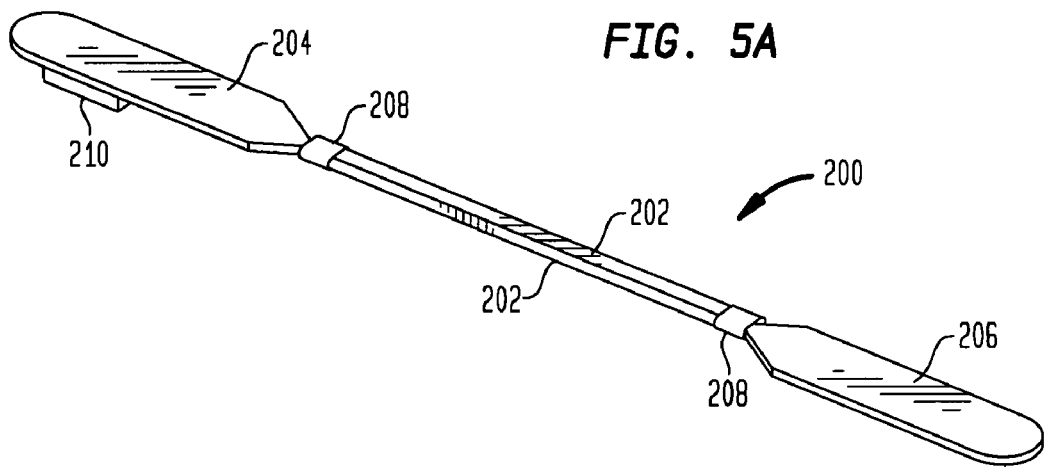
FIG. 5A is a perspective view of a strap in its unwrapped position where the strap is used as a mounting platform for the electronic elements in accordance with an embodiment of the present invention.
Figure 5B:
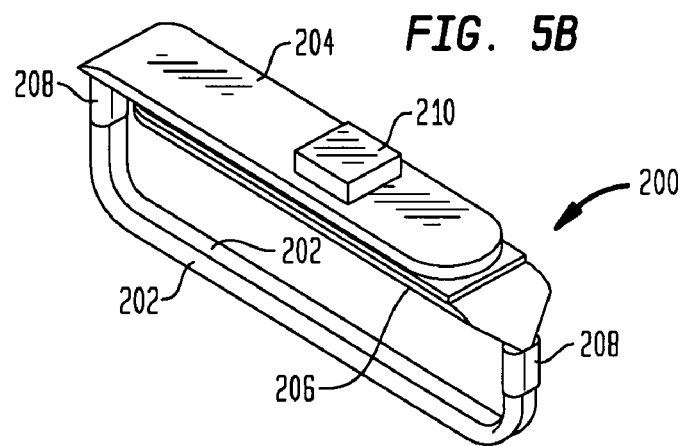
FIG. 5B is a perspective view of the strap in its wrapped position.

Housing 100/102 is attached to a user's shoe (e.g., golf shoe) 300 using a strap assembly 200 that is shown in isolation in FIGS. 5A and 5B. Strap assembly 200 has one or more elastic strips 202 that are terminated by hook-and-loop (e.g., VELCRO) pads 204 and 206. Pads 204 and 206 can be coupled to strips 202 by, for example, crimping ferrules 208. However, any other suitable means of attachment could be used without departing from the scope of the present invention. Mounted on pad 204 is a magnet catch 210 that will cooperate with magnet 130 as will be explained below.

Figure 4:
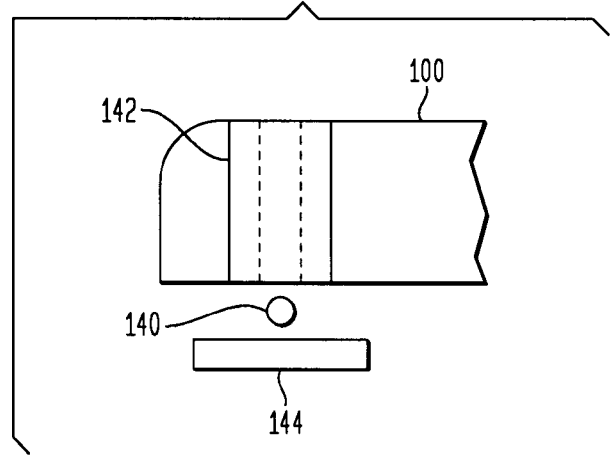
FIG. 4 is an exploded view of an embodiment of a hands-free switch construction in a vertical orientation.
Figure 6:
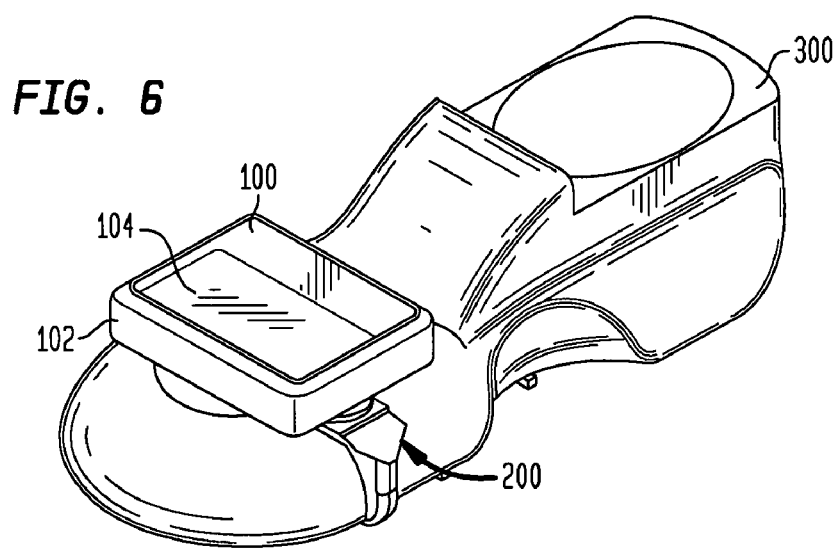
FIG. 6 is a perspective view of the embodiment illustrated in FIGS. 3-5 as it would be attached to a user's shoe.

In use, strap assembly 200 is wrapped around the toe region of a user's shoe (FIG. 6). Housing 100/102 is then placed on strap assembly 200 such that magnet 130 and magnet catch 210 (not visible in FIG. 6) are coupled together via magnetic attraction. In this mounted position, sleeve 142 will be vertically oriented (as best seen in FIG. 4) with ball bearing 140 resting loosely therein as previously described. When the user wants to toggle or scroll through the various instructions stored on memory 112, the user simply taps his foot on the ground. This action will cause relative vertical movement between ball bearing 140 and sleeve 142 thereby causing ball bearing 140 to strike piezoelectric element 144 to generate a "scroll" pulse for processor 110.

The advantages of the present invention are numerous. An activity's instructions can be written/formatted by a user in a way that is most beneficial to that user, and then the instructions can be displayed without using one's hands. Thus, the present invention is ideally suited for a variety of activities (e.g., golf, cooking, carpentry, sewing, etc.) where the user needs his hands readily available, but also needs tips, lessons, reminders, etc., of the best way for this user to carry out the activity.

Although the invention has been described relative to a specific embodiment thereof, there are numerous variations and modifications that will be readily apparent to those skilled in the art in light of the above teachings. For example, the present invention is not limited to attachment on one's foot/shoe as other suitable points of attachment could also be used. Further, other forms of hands-free input could be used as well as could other types of belts, straps, etc. used to attach the electronics to a user. It is therefore to be understood that, within the scope of the appended claims, the invention may be practiced other than as specifically described.

What is claimed as new and desired to be secured by Letters Patent of the United States is:

1. An instruction display system, comprising:
   a housing;
   memory means adapted to be accessible by a user for storing instruction information in a format specified by a user;
   display means for displaying selected portions of said instruction information;
   hands-free user-controlled processing means electrically coupled to said memory means and said display means, said hands-free user-controlled processing means comprising a switch that causes said processing means to sequentially step or scroll through said instruction information stored in said memory means each time said hands-free user-controlled processing means is actuated, said processing means adapted to receive user inputs in a hands-free fashion with said user inputs defining said selected portions to be displayed, said switch comprising a sleeve coupled to said housing, a ball bearing slidably positioned within said sleeve, and a piezoelectric element coupled to an end of said sleeve such that when said housing is moved sufficient that said ball bearing and said sleeve experience relative movement therebetween and said ball bearing impacts said piezoelectric element, said impact causes said piezoelectric element to actuate said hands-free user-controlled processing means; and
   mounting means adapted to be attached to the user for coupling said memory means, said display means and said processing means to the user.

2. The instruction display system of claim 1, wherein said mounting means is adapted to be attached to the user's foot such that said switch is actuated each time the user's foot is tapped on the ground.

3. The instruction display system of claim 1, wherein said memory means comprises a removable memory device.

4. The instruction display system of claim 1, further comprising data transfer means adapted to couple a host computer to said memory means for transferring said instruction information from the host computer to said memory means.

5. The instruction display system of claim 1, wherein said display means comprises a liquid crystal display.

6. The instruction display system of claim 1, wherein said instruction information comprises golf instructions.

7. An instruction display system, comprising:
   a housing;
   memory means supported by said housing and adapted to be accessible by a user for storing instruction information in a format specified by a user;
   display means supported by said housing for displaying selected portions of said instruction information;
   hands-free user-controlled processing means supported by said housing and electrically coupled to said memory means and said display means, said hands-free user-controlled processing means comprising a switch that causes said processing means to sequentially step or scroll through said instruction information stored in said memory means each time said hands-free user-controlled processing means is actuated, said processing means adapted to receive user inputs in a hands-free fashion to scroll through said selected portions, said switch comprising a sleeve coupled to said housing, a ball bearing slidably positioned within said sleeve, and a piezoelectric element coupled to an end of said sleeve such that when said housing is moved sufficient that said ball bearing and said sleeve experience relative movement therebetween and said ball bearing impacts said piezoelectric element, said impact causes said piezoelectric element to actuate said hands-free user-controlled processing means; and
   mounting means adapted to be attached to the user and coupled to said housing.

8. The instruction display system of claim 7, wherein said mounting means is adapted to be attached to the user's foot such that said switch is actuated each time the user's foot is tapped on the ground.

9. The instruction display system of claim 7, wherein said memory means comprises a removable memory device.

10. The instruction display system of claim 7, further comprising data transfer means adapted to couple a host computer to said memory means for transferring said instruction information from the host computer to said memory means.

11. The instruction display system of claim 7, wherein said display means comprises a liquid crystal display.

12. The instruction display system of claim 7, wherein said instruction information comprises golf instructions specifically designed for the user.

13. An instruction display system, comprising:
   a housing;
   memory means supported by said housing and adapted to be accessible by a user for storing instruction information in a format specified by a user;
   display means supported by said housing for displaying selected portions of said instruction information;
   hands-free user-controlled processing means supported by said housing and electrically coupled to said memory means and said display means, said hands-free user-controlled processing means comprising a switch that causes said processing means to sequentially step or scroll through said instruction information stored in said memory means each time said hands-free user-controlled processing means is actuated, said processing means adapted to receive user inputs in a hands-free fashion to scroll through said selected portions, said switch comprising a sleeve coupled to said housing, a ball bearing slidably positioned within said sleeve, and a piezoelectric element coupled to an end of said sleeve such that when said housing is moved sufficient that said ball bearing and said sleeve experience relative movement therebetween and said ball bearing impacts said piezoelectric element, said impact causes said piezoelectric element to actuate said hands-free user-controlled processing means;
   a strap adapted to be attached to the user's foot; and
   coupling means for attaching said housing to said strap.

14. The instruction display system of claim 13, wherein said memory means comprises a removable memory device.

15. The instruction display system of claim 13, further comprising data transfer means adapted to couple a host computer to said memory means for transferring said instruction information from the host computer to said memory means.

16. The instruction display system of claim 13, wherein said display means comprises a liquid crystal display.

17. The instruction display system of claim 13, wherein said instruction information comprises golf instructions specifically designed for the user.

\* \* \* \* \*